April 2, 1946.   S. B. OSINSKI   2,397,688
ELECTRIC OUTLET BOX
Filed April 12, 1944
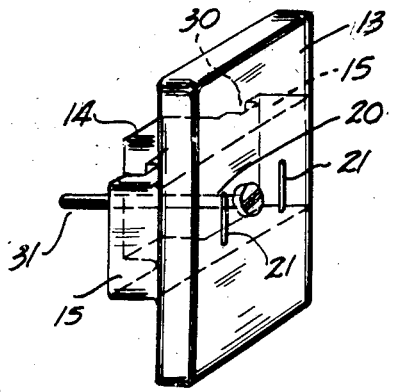
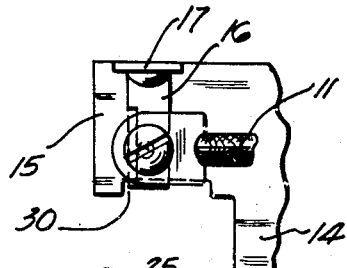
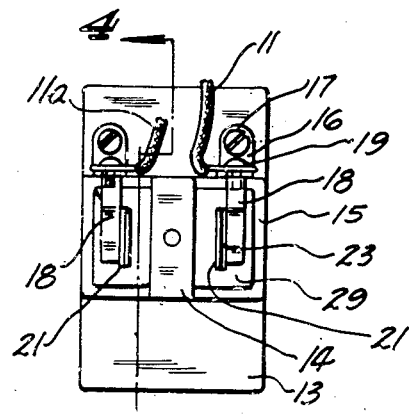
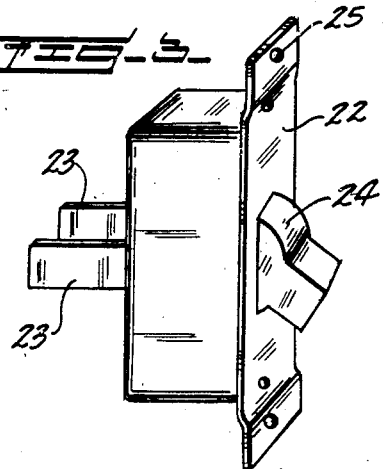
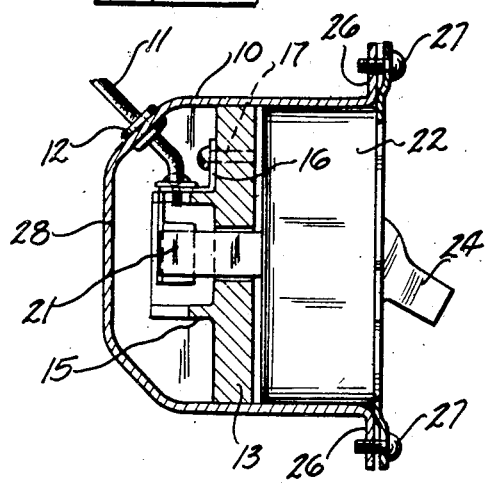
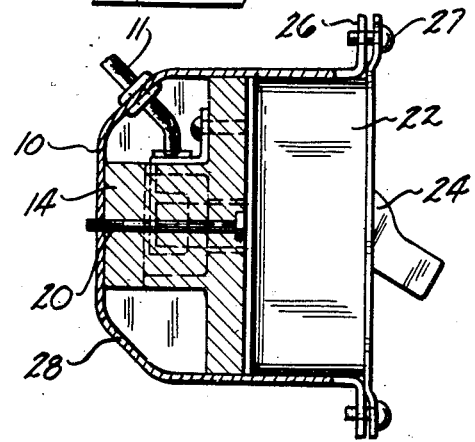
INVENTOR.
STEPHEN B. OSINSKI.
BY Louis Chayka
ATTORNEY.

UNITED STATES PATENT OFFICE 2,397,688

ELECTRIC OUTLET BOX

Stephen B. Osinski, Detroit, Mich.

Application April 12, 1944, Serial No. 530,700

1 Claim. (Cl. 174—53)

My improvement relates to outlet boxes commonly used in inside electrical wiring of buildings, the boxes containing terminals of wiring and being adapted for installation of switches and plugs for convenient electrical connection of lights, household appliances and so forth.

The purpose of my improvement is to provide a box of such a type that a conventional switch or a conventional plug, but slightly changed from its present form, may be readily installed therein without the need of manipulating the exposed wires connected to their respective terminal within the box. My further purpose is to provide a box in which all the wiring is concealed so that the installation of said switches or plugs is an entirely safe operation in addition to being simple and easy.

Another object of my invention was to provide an outlet box having the above advantages and yet one that would be reasonable in cost and would not depart too much from the form and structure of the box which at present is in general use.

I shall now describe my invention with reference to the accompanying drawing in which, Fig. 1 is a perspective view of an element, being a part of my outlet box;

Fig. 2 is a rear elevation of the element shown in Fig. 1;

Fig. 3 is a perspective view of a switch, conventional in form except that it is provided with contact prongs, projecting therefrom;

Fig. 4 is a sectional view of an outlet box, including a sectional view of the element shown in Fig. 2, on line 4—4, therein;

Fig. 5 is a central sectional view through the same outlet box including the element shown in Fig. 1.

Fig. 6 is a plan elevation of a detail, pertaining to the mounting of an electric contact member.

Similar numerals refer to similar parts throughout the several views.

The outlet box 10, is made of metal and is ordinarily concealed within the structural frame of a building by a removable plate. Disposed within the box, parallel to its rear wall 28, is a shield shown in Fig. 1. It includes a rectangular face plate 13, fitting into the open side of the box, and two hollow blocks 15, one on each side of a central rib or ridge 14, both the blocks and the ridge being located on the rear side of said shield. The rear surface of the ridge 14, extending parallel to the face of the shield, reaches somewhat beyond the limits of the abutting blocks 15, so that when the shield is in its operative position within the box, only the ridge is in contact with the rear wall 28 of the box.

Mounted on the rear side of the shield, just above blocks 15, are angle-type connectors 16, secured to plate 13 by means of screws 17. The connectors extend downwardly to form contact springs 18. The upper wall of each block 15, has a recess 30 holding a respective spring 18. Terminals of current conducting wires 11 and 11a, are affixed to said members 18 by means of screws 19. It will be understood that the shield is made of porcelain, Bakelite or some other suitable dielectric material and so are the bushings 12, set in the wall of box 10, as shown.

The shield contains two spaced slots 21, opening into hollow spaces 29 within blocks 15. A bolt 20 holds the shield in its place in the box, the threaded end of the bolt fitting into a correspondingly threaded hole in the rear wall of the box. Said threaded end of the bolt is indicated by numeral 31. The shield being in its place as shown in Figs. 4 and 5, the front side of the outlet box is devoid of all wiring. In order therefore that contact springs 18 may be reached for the purpose of electrical connections, it is necessary to use switches and plugs provided with prongs fitting into said slots 21. A switch of that type is shown in Fig. 3. It includes a front plate 22, provided with end holes 25 for connection to the outlet box, and two prongs 23 adapted to enter into slots 21 and into contact with springs 18. Figs. 4 and 5 show how the front plate of the switch is affixed to the flanges 26 of box 10 by means of screws 27.

Should it be necessary to inspect the wiring back of the shield, it is an easy matter to unscrew bolt 20, to withdraw the shield from the box far enough to gain access to the wiring and to adjust the wires as may be necessary.

It will be obvious that further improvements may be made in the outlet box within the limits of my disclosure. What I therefore, wish to claim, is as follows:

A removable receptacle made of dielectric material and adapted to fit into an electric box of the kind described, the receptacle being provided with a face fronting the open side of the box, and having on its rear side a centrally located oblong ridge adapted to bear against the rear wall of the outlet box, a hollow block on each side of the ridge, means on each block for connection to a respective terminal of an electric circuit and a resilient metal prong extending from said means to the hollow space of the respective block, said face having two spaced slots, opening from the front side into the hollow spaces of said blocks, said slots being adapted to receive prongs of removable members to effect electric contact with the respective prongs within said hollow blocks, and screw means to affix the receptacle within the box, said box serving to house the means for connection to the electric circuit.

STEPHEN B. OSINSKI.